United States Patent [19]

Kimura et al.

[11] 4,360,621
[45] Nov. 23, 1982

[54] LOW VISCOUS P-PHENYLENE DIAMINE STABILIZERS

[75] Inventors: Osamu Kimura; Takashi Kojima, both of Toyonaka; Eizo Okino, Nishinomiya; Hideo Nagasaki, Osaka, all of Japan

[73] Assignee: Sumitomo Chemical Company, Limited, Osaka, Japan

[21] Appl. No.: 244,324

[22] Filed: Mar. 16, 1981

[30] Foreign Application Priority Data

Mar. 31, 1980 [JP] Japan ................... 55-42410

[51] Int. Cl.³ .................... C08K 5/18; C07C 87/58
[52] U.S. Cl. .................... 524/255; 252/401; 564/434; 260/809
[58] Field of Search ............ 564/434; 260/45.9 QB, 260/809; 252/401; 524/255

[56] References Cited

U.S. PATENT DOCUMENTS

| | | | |
|---|---|---|---|
| 3,271,453 | 9/1966 | Csendes | 564/434 |
| 3,432,460 | 3/1969 | Spacht | 260/45.9 QB |
| 3,637,573 | 1/1972 | Mise et al. | 260/37 N |
| 3,927,099 | 12/1975 | Hollingshead | 564/434 |
| 4,256,669 | 3/1981 | Benner et al. | 564/434 |
| 4,269,763 | 5/1981 | Miller | 260/45.9 QB |

Primary Examiner—V. P. Hoke
Attorney, Agent, or Firm—Wenderoth, Lind & Ponack

[57] ABSTRACT

A normally liquid stabilizer for rubber or urethane resin, obtained by reacting hydroquinone with a mixture of aromatic amines of the formula:

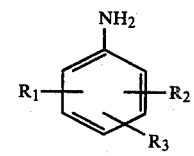

wherein $R_1$, $R_2$ and $R_3$, independently of each other, are hydrogen or $C_{1-18}$ alkyl, said aromatic amine mixture containing 7-26 weight % of p-ethylaniline and 8-40 weight % of 2,4-xylidine.

13 Claims, No Drawings

LOW VISCOUS P-PHENYLENE DIAMINE STABILIZERS

The present invention relates to a low viscosity stabilizer for rubbers and urethane resins, and particularly to a low viscosity stabilizer for oxidation-susceptible diene rubbers, which is remarkably improved in operability in comparison with conventional stabilizers.

Since rubbers and urethane resins are deteriorated under the action of heat, ultraviolet rays, oxygen, ozone, etc., causing a gradual decrease in mechanical strength, it has been customary practice for the prevention of this deterioration to use various stabilizers such as phenyl-β-naphthylamine, diphenyl-p-phenylenediamine, N-phenyl-N'-isopropyl-p-phenylenediamine, etc. However, as these conventional stabilizers are in solid form at normal temperatures, there have been problems in operability, automatic metering, working environment, etc.

In order to remedy these disadvantages, various measures have been taken, and liquid stabilizers which are easy to handle are in great demand.

As regards such stabilizers, there have been proposed in Japanese Patent Publication No. 29617/1974 alkyl-substituted diphenyl-p-phenylenediamines having a melting point lower than 80° C. Although these diamines have a low melting point, some contain solid portions at room temperature while others have very high viscosity in spite of their apparently liquid form. Therefore, it is necessary to use them after they have been maintained at an elevated temperature for a long time, so that they have not been of practical use.

The present inventors have made various experiments on diaryl-p-phenylenediamines as stabilizers, and found that, in reacting hydroquinone with aromatic amines, when an aromatic amine mixture containing specific amounts of particular aromatic amines is used as the starting material, it is possible to obtain a diaryl-p-phenylenediamine which is liquid at normal temperatures and has a very low viscosity, and that said diamine exhibits a very good effect as a stabilizer for rubbers and urethane resins.

Thus, the present invention provides a low viscosity stabilizer for rubbers and urethane resins which is liquid at normal temperatures and which contains, as effective ingredient, a diaryl-p-phenylenediamine mixture obtained by reacting hydroquinone with an aromatic amine mixture represented by the following general formula (I):

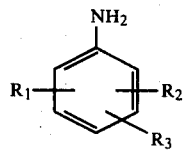
(I)

wherein each of $R_1$, $R_2$ and $R_3$ stands independently for a hydrogen atom or a $C_{1-18}$ alkyl group, said aromatic amine mixture containing 7–26 weight % of p-ethylaniline and 8–40 weight % of 2,4-xylidine.

The aromatic amine mixture to be used in the present invention is an aromatic amine mixture represented by the above general formula (I), and it is necessary that 7–26 weight % of p-ethylaniline and 8–40 weight % of 2,4-xylidine should be contained in said mixture. When this condition is not satisfied, it is impossible to sufficiently attain the desired effect.

As the aromatic amines represented by the general formula (I), there may be exemplified: aniline, toluidine, ethylaniline, xylidine, trimethylaniline, diethylaniline, cumidine, butylaniline, dibutylaniline, butyltoluidine, dibutyltoluidine, amylaniline, hexylaniline, heptylaniline, octylaniline, nonylaniline, dodecylaniline, tridecylaniline, tetradecylaniline, stearylaniline, etc.

The reaction of such an aromatic amine mixture with hydroquinone is carried out in the presence of a catalyst. As the catalyst, there may be used a known dehydration alkylation catalyst, for example halogenated metals such as boron trifluoride, aluminum chloride, ferrous chloride, ferric chloride, zinc chloride, titanium tetrachloride, etc.; halogen elements such as iodine; inorganic acids such as sulfuric acid, phosphoric acid, etc.; and organosulfonic acids such as p-toluenesulfonic acid, methanesulfonic acid, etc.

The reaction may be carried out under any of reduced pressure, atmospheric pressure and increased pressure, preferably in combination with a measure taken for the removal of the resulting water out of the reaction system. The reaction temperature is preferably within the range of from 150° to 300° C., but taking the reaction time, etc. into consideration, temperatures from 190° to 250° C. are most preferable. Solvents may be used, and for example, toluene, ethylbenzene or xylene may be used for dehydration purposes at the same time.

It is desirable that the amount of the aromatic amines to be used for reaction with hydroquinone is more than 1.6 mols per mol of hydroquinone, and particularly preferably from 1.8 to 2.5 mols.

The thus obtained diaryl-p-phenylenediamine mixture is very useful as a low viscosity stabilizer for rubbers and urethane resins. The rubbers which can be stabilized by the stabilizer of the present invention are natural rubber and synthetic rubbers. Such synthetic rubbers include polychloroprene, polyisoprene, polybutadiene and styrene-butadiene copolymer rubber. The urethane resins which can be stabilized by the stabilizer of the present invention are polyurethanes which may be obtained by the addition polymerization of polyisocyanate with polyether glycols or polyester glycols in the presence of a molecular chain extender such as diamines, polyamines, water, hydrazines, etc.

In adding the stabilizer of the present invention to rubbers, it may be added to rubber latexes or to rubbers obtained by coagulating rubber latexes, or it may be added, upon vulcanization, to rubbers together with other reagents. The amount to be added is usually 0.05–5 weight parts, preferably 0.1–3 weight parts, per 100 weight parts of rubber. The stabilizer can be added to urethane resins before or during polymerization or at any stage after polymerization. The amount to be added is usually 0.1–10 weight parts, preferably 0.5–5 weight parts, per 100 weight parts of urethane resin.

In either case of rubbers or urethane resins, upon the use of the stabilizer, other additives may be added, if necessary, at the same time or separately.

In the following, the present invention will be explained by way of examples, wherein all percentages are by weight.

EXAMPLE 1

146.7 g. hydroquinone, 90 g. o-toluidine, 237 g. mixed amines (consisting of 24% p-ethylaniline, 24.1% 2,4- xylidine, 23% o-ethylaniline, 3.8% 2,6-xylidine, 1.1% 3,5-xylidine, 6.6% 2,3-xylidine, 4.4% 3,4-xylidine and 13% 2,5-xylidine) and 10.8 g. ferric chloride were charged into a 1-liter flask equipped with a water separator, a thermometer and a stirrer.

After elevation to 220° C., the reaction system was maintained at this temperature for three hours, and thereafter it was cooled. After the reaction system was washed with water and neutralized with an aqueous sodium bicarbonate solution, unreacted materials, etc. were removed by vacuum distillation. A brownish liquid diaryl-p-phenylenediamine mixture was obtained in a 95.0% yield. The viscosity of this mixture was measured by means of a B-type viscometer and was found to be 150 cps at 60° C.

In this connection, the content of p-ethylaniline and 2,4-xylidine in the starting material aromatic amine mixture was 17.4% and 17.5%, respectively.

EXAMPLE 2

110.1 g. hydroquinone, 36.2 g. p-ethylaniline, 105.7 g. 2,4-xylidine, 69.5 g. diethylaniline, 90.6 g. stearylaniline, 5 g. ferric chloride anhydride and as a water-removing solvent, 5 g. toluene were charged into a flask. Thereafter, by following the same operation as in Example 1, a brownish liquid diaryl-p-phenylenediamine mixture was obtained. The viscosity of this mixture by a B-type viscometer was 120 cps at 60° C.

In this connection, the content of p-ethylaniline and 2,4-xylidine in the starting material aromatic amine mixture was 12.0% and 35.0%, respectively.

EXAMPLE 3

165.2 g. hydroquinone, 40.5 g. aniline, 132.1 g. p-toluidine, 101.6 g. p-ethylaniline (25% based on the total of the aromatic amines), 20.2 g. o-ethylaniline, 112.0 g. 2,4-xylidine (27.6% based on the total of the aromatic amines), 1.5 g. iron powder and 4.8 g. iodine were charged into a flask equipped with a water separator. Five grams of ethylbenzene was added as a water-removing solvent, and the temperature of the reaction system was elevated to 240° C. After the theoretical amount of water was distilled off, the reaction system was cooled. An aqueous solution of sodium thiosulfate was then added and the reaction system was stirred. Thereafter, by allowing the system to stand still, the water layer was removed. After washing with water sufficiently, the unreacted aromatic amines were removed by distillation. 340.7 g. of a brownish liquid diaryl-p-phenylenediamine mixture was obtained in the reaction vessel. The viscosity of this mixture by a B-type viscometer was 170 cps at 60° C.

EXAMPLES 4–7 AND COMPARATIVE EXAMPLES 1–14

In the same manner as described in Example 1, various diaryl-p-phenylenediamines were obtained by using the aromatic amines shown in Table 1, wherein P-Et-An represents p-ethylaniline and 2,4-X represents 2,4-xylidine.

TABLE 1

| | Aromatic amine | Amount used *1 | Content of P—Et—An *2 | Content of 2,4-X *2 | Diaryl-p-phenylenediamine State at normal temperatures | Viscosity at 60° C. |
|---|---|---|---|---|---|---|
| Comparative Examples | | | | | | |
| 1 | o-toluidine | 204.4 | | | solid | |
| 2 | p-toluidine | 180.1 | | | solid | |
| 3 | o-ethylaniline | 231.1 | | | solid | |
| 4 | toluidine mixture (o-form 12.4% m-form 49.9% p-form 37.8%) | 238.5 | | | solid | |
| 5 | toluidine mixture (o-form 60% m-form 8% p-form 32%) | 204.4 | | | solid | |
| 6 | aniline o-toluidine | 93.2 107.2 | | | solid | |
| 7 | aniline toluidine mixture (same as in Comparative Example 4) | 88.8 102.1 | | | solid | |
| 8 | aniline o-toluidine 2,3-xylidine | 59.2 68.1 77.0 | | | solid | |

TABLE 1-continued

| | Aromatic amine used | | | | Diaryl-p-phenylenediamine | |
|---|---|---|---|---|---|---|
| | Aromatic amine | Amount used *1 | Content of P—Et—An *2 | Content of 2,4-X *2 | State at normal temperatures | Viscosity at 60° C. |
| | aniline | 44.4 | | | | |
| | toluidine mixture | 102.2 | | | | |
| 9 | (o-form 63% m-form 5% p-form 32%) | | 5.8% | 8.1% | solid | |
| | xylidine mixture (containing 20.2% P—Et—An, 28.5% 2,4-X) | 57.8 | | | | |
| | aniline | 34.7 | | | | |
| | toluidine mixture | 79.9 | | | | |
| 10 | (same as in Comparative Example 9) | | 1.8% | 17.8% | solid | |
| | xylidine mixture (containing 4.1% P—Et—An, 40.5% 2,4-X) | 90.3 | | | | |
| | o-toluidine | 61.3 | | | | |
| | xylidine | 161.8 | | | | |
| 11 | mixture (containing 6.7% P—Et—An, 9.5% 2,4-X) | | 4.9% | 6.9% | solid | |
| | toluidine mixture (same as in Comparative Example 4) | 89.5 | | | | |
| 12 | | | 2.6% | 25.5% | crystals separated out in part | 915 cps |
| | xylidine mixture (same as in Comparative Example 10) | 151.8 | | | | |
| | toluidine mixture (same as in Comparative Example 4) | 107.0 | | | | |
| 13 | | | 2.2% | 21.5% | crystals separated out in part | 1105 cps |
| | xylidine mixture (same as in Comparative Example 10) | 121.1 | | | | |
| | o-toluidine | 85.7 | | | | |
| | xylidine mixture | 145.3 | | | crystals separated out in part | 955 cps |
| 14 | (containing 4.6% P—Et—An, 37.9% 2,4-X) | | 2.9% | 23.8% | | |

Examples

| | Aromatic amine | Amount used *1 | Content of P—Et—An *2 | Content of 2,4-X *2 | State at normal temperatures | Viscosity at 60° C. |
|---|---|---|---|---|---|---|
| | P—Et—An | 53.6 | | | | |
| | 2,4-X | 53.6 | | | | |
| 4 | butylaniline | 80.5 | 20.0 | 20.0 | liquid | 105 cps |
| | octylaniline | 80.5 | | | | |
| | P—Et—An | 62.8 | | | | |
| | 2,4-X | 43.6 | | | | |
| 5 | aniline | 27.3 | 23.0 | 16.0 | liquid | 55 cps |
| | o-toluidine | 27.3 | | | | |
| | mixed cumidines | 111.0 | | | | |
| | (containing o-form 30% p-form 60%) | | | | | |

TABLE 1-continued

| | Aromatic amine | Amount used *1 | Content of P—Et—An *2 | Content of 2,4-X *2 | Diaryl-p-phenylene-diamine State at normal temperatures | Viscosity at 60° C. |
|---|---|---|---|---|---|---|
| 6 | mixed xylidines (containing 35% P—Et—An, 13.5% 2,4-X) mixed toluidines (containing o-form 65% p-form 30%) | 151.5 47.0 | 25.3 | 9.8 | liquid | 135 cps |
| 7 | aniline P—Et—An 2,4-X dodecyl- aniline | 10.5 72.7 43.7 247.4 | 20.0 | 12.0 | liquid | 47 cps |

*1 Amount of aromatic amine (parts by weight) used per 100 parts by weight of hydroquinone
*2 Content in the total of aromatic amines

REFERENCE EXAMPLE 1

1500 g. SBR latex (No. 1500, product of Sumitomo Chemical Company, Limited) was elevated to a temperature between 45° and 50° C. A 20% aqueous dispersion of various stabilizers was added thereto, and the mixture was mixed with a dispersing apparatus for 10 minutes. A solid rubber was obtained by the usual process.

The rubber mixed with 0.2 PHR of various stabilizers was cut into small pieces, which were put into weighing bottles and were subjected to aging at 100° C. in a test tube heat aging tester in accordance with the method of JIS K 6301.

The rubber aged for predetermined periods of time was cut off and immersed in benzene for 48 hours. The resulting solution was filtered through a 100-mesh wire gauze. Undissolved portions were weighed after drying. This weight was regarded as that of the gel portions (%).

TABLE 2

Variation of the gel portions dependent on deterioration periods.

| Stabilizer | Deterioration periods (hours) | | | | |
|---|---|---|---|---|---|
| | 0 | 25 | 50 | 75 | 100 |
| Control | 0% | 75% | —% | —% | —% |
| Compound of Example 1 | 0 | 0.2 | 0.2 | 0.3 | 0.3 |
| Compound of Comparative Example 6 | 0 | 0.2 | 2.5 | 44 | — |
| Phenyl-β-naphthylamine* | 0 | 0.2 | 0.3 | 7.3 | 20 |
| N—phenyl-N'—1,3-dimethylbutyl-p-phenylenediamine | 0 | 0.2 | 0.2 | 1.0 | 11 |

*0.6 PHR was added.

REFERENCE EXAMPLE 2

200 g. polyester having hydroxyl groups at the terminals and obtained from 1,4-butanediol and adipic acid and 27 g. 1,4-butanediol were mixed thoroughly at 80° C. To this mixture, 124 g. 4,4'-diphenylmethane diisocyanate maintained at 45° C. was added. The reaction system was stirred vigorously. After two minutes, the reaction product which became viscous was poured out quickly into a vat.

The product was aged in an oven at 90° C. for 10 hours and was cooled. The polyurethane resin thus obtained was crushed into the form of chips, which were dissolved in dimethylformamide at 70° C. to produce a viscous solution having a solid matter concentration of 20%.

Various stabilizers were added respectively to the polyurethane resin solution so that they could be dissolved sufficiently uniformly. By removing the solvent from these solutions, transparent films having a thickness of 0.06 mm were produced. These films were subjected to exposure tests in a weather-O-meter to examine their variation in strength. The results, stabilizers used and their amounts are shown in Table 3.

TABLE 3

Variation in strength of the polyurethane films.

| | | Physical properties | | | | | |
|---|---|---|---|---|---|---|---|
| | | Tensile strength (kg/cm²) | | | Elongation (%) | | |
| | Amount added | Exposure time (hrs.) | | | | | |
| Stabilizer | (PHR) | 0 | 40 | 80 | 0 | 40 | 80 |
| Control | | 700 | 355 | 250 | 405 | 90 | 20 |
| Compound of Example 4 | 5% | 695 | 570 | 475 | 410 | 390 | 305 |
| Compound of Example 7 | 5% | 705 | 550 | 480 | 405 | 380 | 290 |
| Irganox 1010 *1 | 5% | 690 | 440 | 390 | 400 | 210 | 115 |
| Cinubin 326 *2 | 5% | 700 | 400 | 305 | 405 | 235 | 130 |

*1 Commercial stabilizer (product of Ciba-Geigy)
*2 Commercial stabilizer (product of Ciba-Geigy)

What we claim is:

1. A normally liquid stabilizer for rubbers and urethane resins, which comprises, as the effective ingredient, a diaryl-p-phenylenediamine mixture obtained by reacting hydroquinone with an aromatic amine mixture of aromatic amines of the formula:

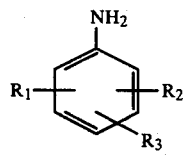

wherein $R_1$, $R_2$ and $R_3$, independently of each other, are hydrogen or $C_{1-18}$ alkyl, said aromatic amine mixture containing 7-26 weight % of p-ethylaniline and 8-40 weight % of 2,4-xylidine.

2. A stabilizer as claimed in claim 1, having a viscosity of not greater than 170 cps at 60° C. as measured by a B-type viscometer.

3. A method of stabilizing a rubber or urethane resin against oxidation, which comprises mixing a stabilizing amount of a stabilizer of claim 1 with the rubber or urethane resin.

4. A stabilizer as claimed in claim 1 wherein the aromatic amines are selected from aniline, toluidine, ethylaniline, xylidine, trimethylaniline, diethylaniline, cumidine, butylaniline, dibutylaniline, butyltoluidine, dibutyltoluidine, amylaniline, hexylaniline, heptylaniline, octylaniline, nonylaniline, dodecylaniline, tridecylaniline, tetradecylaniline and stearylaniline.

5. A stabilizer as claimed in claim 1 wherein the amount of the aromatic amine mixture to be reacted with hydroquinone is more than 1.6 mols per mol of hydroquinone.

6. A stabilizer as claimed in claim 1 wherein the amount of the aromatic amine mixture to be reacted with hydroquinone is 1.8-2.5 mols per mol of hydroquinone.

7. A stabilizer as claimed in claim 1 wherein the reaction is conducted in the presence of a dehydration alkylation catalyst.

8. A stabilizer as claimed in claim 1 wherein the reaction is conducted at a temperature of 150°-300° C.

9. A stabilizer as claimed in claim 8 wherein the reaction is conducted at a temperature of 190°-250° C.

10. A rubber composition comprising a natural or synthetic rubber and a stabilizer of claim 1.

11. A rubber composition as claimed in claim 10, wherein the rubber is a diene-rubber.

12. A vulcanized rubber product obtained from the rubber composition of claim 10.

13. A urethane resin composition comprising a urethane resin and a stabilizer of claim 1.

* * * * *